United States Patent [19]
Huhman et al.

[11] Patent Number: 4,738,270
[45] Date of Patent: Apr. 19, 1988

[54] ARCUATE PATH CAGE SWEEP

[75] Inventors: Michael L. Huhman, Kansas City; Wayne M. Tiffany, Independence; Ronald W. Baldwin, Kansas City, all of Mo.

[73] Assignee: Deutz-Allis Corporation, Milwaukee, Wis.

[21] Appl. No.: 931,185

[22] Filed: Nov. 17, 1986

[51] Int. Cl.⁴ .............................................. A01F 12/00
[52] U.S. Cl. .................................. 130/27 J; 130/27 H
[58] Field of Search .................... 130/27 J, 27 H, 27 T

[56] References Cited
U.S. PATENT DOCUMENTS

| | | | |
|---|---|---|---|
| 4,108,150 | 8/1978 | Shaver | 130/27 H |
| 4,154,250 | 5/1979 | Stuber | 130/27 H |
| 4,222,395 | 9/1980 | Johnston et al. | 130/27 H |
| 4,337,781 | 7/1982 | Brundage | 130/27 H |
| 4,461,306 | 7/1984 | De Busschen | 130/27 T |

Primary Examiner—Paul J. Hirsch
Attorney, Agent, or Firm—Charles L. Schwab

[57] ABSTRACT

A cage sweep for a foraminous cage of an axial flow combine having axially extending tines which are moved in an arcuate path by an oscillating mechanism having a pitman arm drive. The cage sweep is supported on the cage for movement in an arcuate path by rollers engaging arcuate guide rails.

12 Claims, 2 Drawing Sheets

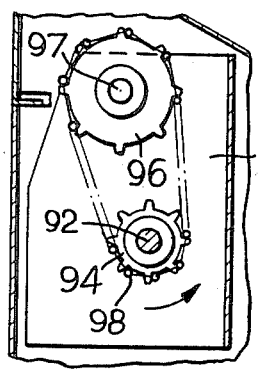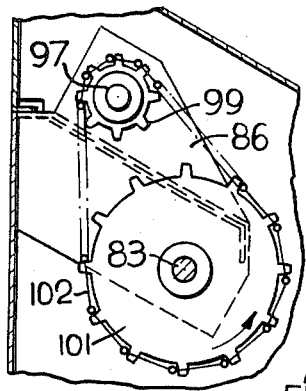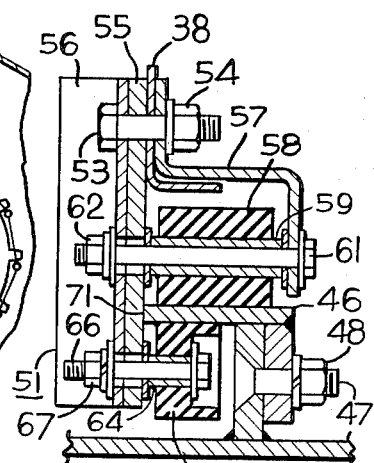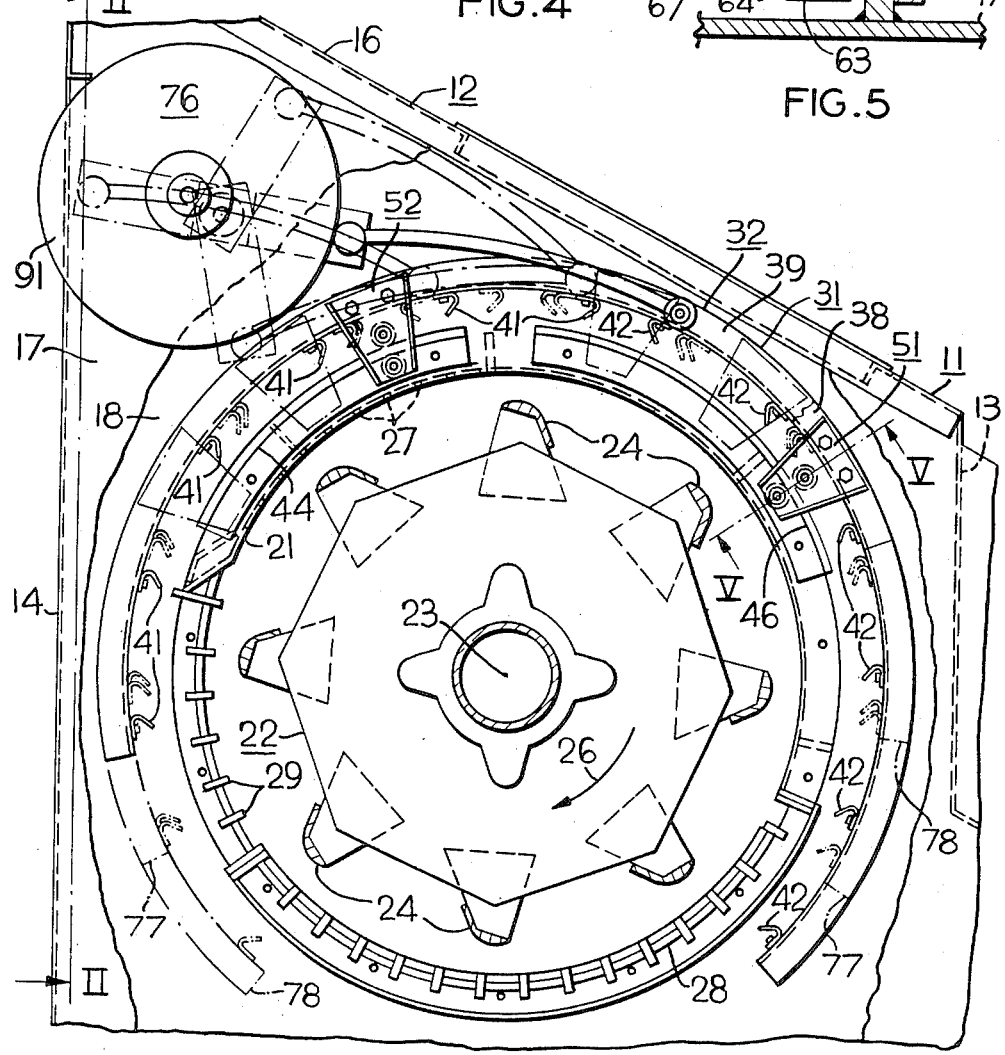

ARCUATE PATH CAGE SWEEP

TECHNICAL FIELD

This invention relates to an axial flow combine and more particularly to a cage sweep mechanism for sweeping threshed crop material from the top and sides of the foraminous processor cage.

PRIOR ART STATEMENT

Cage sweep mechanisms have been used in axial flow combines to dislodge threshed material that passes through the cage openings and accumulates on the upper side of the horizontally disposed cage. Two prior art cage sweeps are shown and described in U.S. Pat. No. 4,108,150 issued Aug. 22, 1978 to J. Lyle Shaver on an "Agitator for an Axial Flow Cylinder" and U.S. Pat. No. 4,337,781 issued on July 6, 1982 to Charles F. Brundage on a "Roller Support for Cage Sweep Mechanism". In each of these prior art constructions, the cage sweep has arcuate fingers and oscillates back and forth horizontally in the axial direction of the cylindrical cage.

OBJECTS AND SUMMARY OF THE INVENTION

It is a primary object of this invention to provide a cage sweep mechanism for sweeping threshed material which has passed through radial openings in a horizontally disposed axial flow threshing and separating cage and which may otherwise tend to accumulate on its upper side.

It is a further object of this invention to provide a cage sweep mechanism of the type hereinbefore outlined in the previous paragraph which oscillates in an arcuate path about the upper part of the cage.

The cage sweep mechanism of this invention is used to sweep threshed material from the top of a horizontally disposed cylindrical threshing and separating cage of the axial flow type in which a threshing rotor is coaxially arranged. The cage sweep includes axially spaced arcuate ribs spaced radially outward from and about the upper part of the cage and circumferentially spaced horizontal tines secured to the ribs. Means are provided to guide the cage sweep in an arcuate path about the upper part of the cage and means are provided to oscillate the cage sweep in its arcuate path.

The means for guiding the cage sweep may include a pair of parallel arcuate rails and rollers carried by the cage sweep and cooperatively engaging the rails. The means for oscillating the cage sweep may include a power operated oscillator having pitman arms and drive links.

The cage sweep of this invention effectively removes threshed material passing through openings in the upper part of the cage which might otherwise accumulate thereon and interfer with efficient operation of the processor section of the combine.

BRIEF DESCRIPTION OF THE DRAWINGS

One embodiment of the invention is shown in the drawings, in which:

FIG. 1 is a partial side view of the processor section of an axial flow combine with parts broken away for illustration purposes;

FIG. 3 is a view taken along the line III—III in FIG. 2;

FIG. 4 is a view taken along the line IV—IV in FIG. 2; and

FIG. 5 is a view taken along the line V—V in FIG. 1.

DETAILED DESCRIPTION OF THE DRAWINGS

Figure 2:
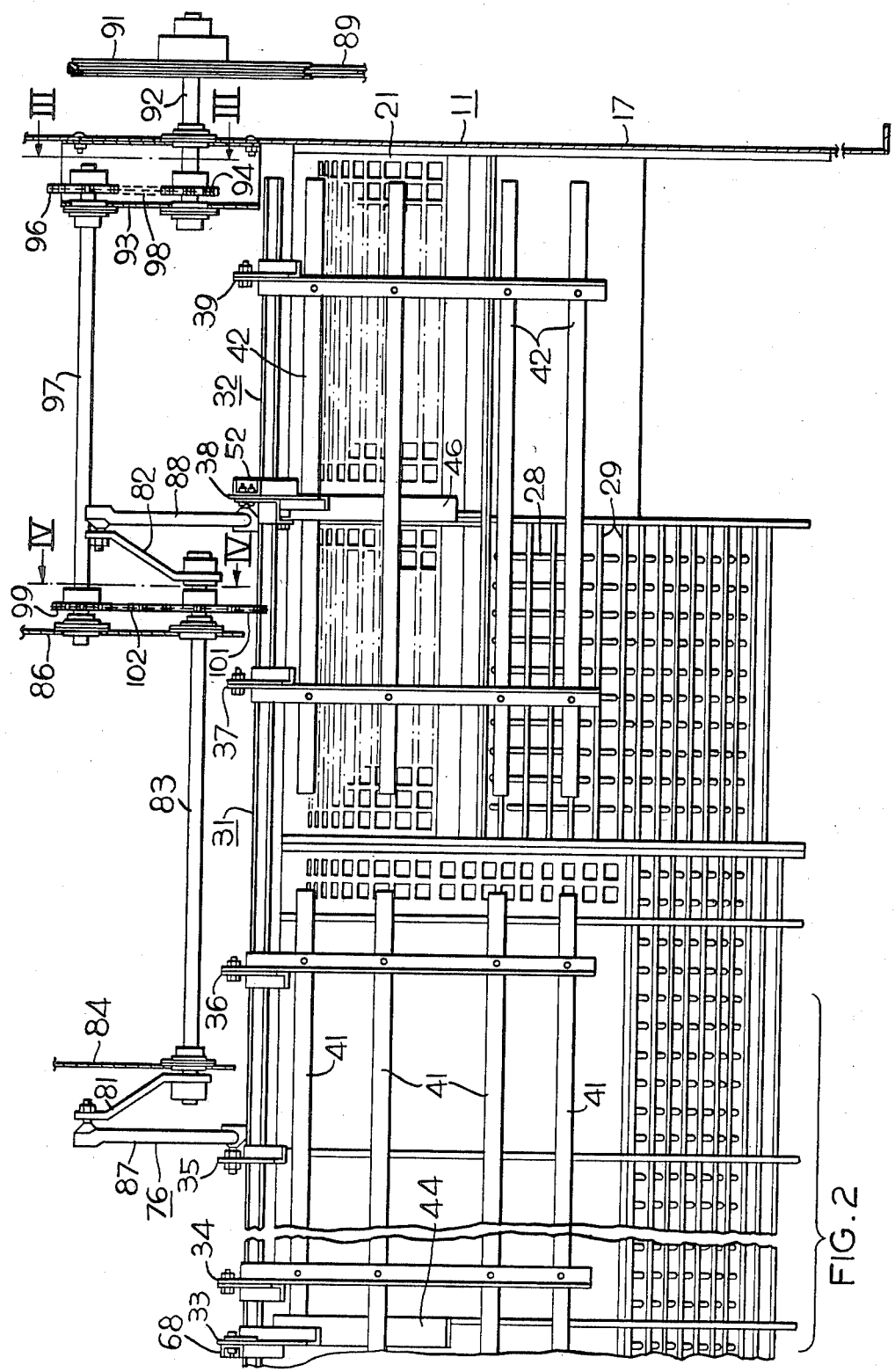
FIG. 2 is a view taken along the line II—II in FIG. 1 with the cage sweep shifted to an intermediate position in its path of oscillation.

Referring to FIGS. 1 and 2 of the drawings, the processor section 11 of the combine includes a housing 12 having a front wall 13, a rear wall 14, a top wall 16 and laterally opposite side walls 17, 18. An axial flow foraminous cage 21 is rigidly secured at its opposite ends to the side walls 17, 18 by suitable means, not shown. A threshing rotor 22 is rotatably mounted on the side walls 17, 18 by suitable bearings, not shown, and its axis of rotation coincides with the horizontal transverse axis 23 of the cage 21. The rotor 22 includes a plurality of axially extending parallel rasp bars 24 which thresh incoming crop material as the rotor rotates in the direction of the arrow 26. Upper parts of the cage include cylindrically shaped plates with perforated openings 27 whereas lower parts of the cage include grates formed of arcuate rods 28 and axially extending bars 29. The concave has been removed for illustration purposes. During operation, threshed crop material such as grain and other small crop particles pass through the radial openings thus provided in the foraminous cage (and also through the concave) while the other crop material moves axially through the interior of the cage to a discharge opening, not shown.

Some of the threshed crop material may tend to accumulate on the top side of the cage 21. A power driven cage sweep mechanism 31 is provided to sweep such material from the top and sides of the cage 21. The cage sweep mechanism 31 includes a cage sweep 32 having a plurality of parallel and axially spaced arcuate ribs 33, 34, 35, 36, 37, 38, 39 and a plurality of axially extending parallel tines 41, 42 secured to the radially inward sides of the associated ribs by suitable fasteners such as bolts and nuts. The tines are V-shaped in section each having one of its two flanges secured to at least two of the ribs. The other of the two flanges of each tine extends radially inward and downward to provide a raking or sweeping action on any accumulation of crop material on the top and sides of the cage 21. As shown in FIGS. 1, 2 and 5, the cage sweep 32 is mounted on a pair of parallel arcuate rails 44, 46 secured to the cage 21 by screws 47 and nuts 48. A pair of circumferentially spaced roller assemblies 51, 52 are secured to the rib 38 of the cage sweep 32 by bolts 53 and nuts 54. As shown in FIG. 5, the roller assembly 51 includes a main plate 55, a flanged reinforcing part 56 and a bracket 57 secured to the rib 38 by bolts 53 and nuts 54. The roller assembly 51 also includes an outer roller 58 rotatably mounted on a bushing 59 mounted on the bracket 57, part 56 and plate 55 by a bolt 61 and nut 62 and an inner roller 63 rotatably mounted on a bushing 64 secured to the plate 55 and part 56 by a bolt 66 and nut 67. The radially outer roller 58 rolls on the radially outer surface of the arcuate rail 46 and the radially inner roller 63 rolls on the radially inner surfaces of the arcuate rail 46. The other roller assemblies are of the same construction as roller assembly 51. Roller assembly 68 and another roller assembly, not shown, are mounted on the rib 33 of the cage sweep 32 and cooperatively engage the rail 44 on the cage 21 in the same general manner that roller assemblies 51, 52 engage the rail 46 except they are reversed in their position whereby their plates are in axial thrust transmitting relation with the axially outer edge surface of the rail 44. Referring specifically to the FIG. 5 showing of roller assembly 51, it will be seen that the axially outer edge surface 71 of the rail 46 is in axially confronting engageable relation to the exposed surface of the plate 55. Thus, the cage sweep 32 is maintained in an operative axial position on the cage 21 by the rails 44, 46 and the roller assemblies.

An oscillator or oscillator mechanism 76 is provided to oscillate the cage sweep 32 in its arcuate path on the rails between its extreme forward position shown in solid lines in FIG. 1, an intermediate position shown by broken lines 77 and an extreme rearward position shown by broken lines 78. The oscillator mechanism includes a pair of pitman arms 81, 82 nonrotatably secured to a transverse shaft 83 rotatably mounted on vertical brackets 84, 86 on the housing 12 and a pair of drive links 87, 88 having first corresponding ends pivotally connected to ribs 35, 38 of the cage sweep 32 and second corresponding ends pivotally connected to the free ends of the pitman arms 81, 82. The pitman shaft 83 is driven through a power train including an endless V-belt 89 driven by the combine engine, not shown. The V-belt 89 is drivingly reeved about a grooved pulley 91 nonrotatably secured to a transverse shaft 92 rotatably mounted on the wall 17 and a bracket 93. The shaft 92 carries a sprocket 94 which is drivingly connected to a sprocket 96 on a transverse shaft 97 by an endless chain belt 98. The transverse shaft 97 is rotatably mounted on brackets 86, 93 and carries a sprocket 99 which is drivingly connected to a sprocket 101 on the shaft 83 by an endless chain belt 102.

The cage sweep mechanism 31 herein shown and described is very efficient in moving crop material off the top and sides of the cage 21 thereby ensuring the desired exit of threshed material from the cage via the radial openings therein. The radially inward and downward extending flanges on the tines 41, 42 aggressively engage and pull any substantial accumulation of crop material from the top and sides of the exterior of the cage 21. The pitman drive is an ideal actuating mechanism for the oscillating cage sweep 32 because of the gradual deceleration and acceleration of the cage sweep movement near the extreme end positions in its arcuate path of oscillation.

The embodiments of the invention in which an exclusive property or privilege is claimed are defined as follows:

1. In an axial flow combine of the type having a processor for threshing and separating the seed from an agricultural crop which includes a foraminous cylindrical cage structure with radial openings and a rotatable rotor coaxially mounted within the cage on a substantially horizontal axis, the combination comprising:
    a cage sweep structure including a plurality of generally parallel and circumferentially spaced tines extending axially along the outer periphery of said cage structure in radially spaced relation to the latter,
    guide means operatively associated with said cage sweep structure and operable to guide the latter in a predetermined arcuate path about the top of said cage structure, and
    an oscillator connected to said cage sweep structure and operable to cyclically move the latter back and forth on said predetermined path whereby said tines sweep crop material from the top exterior of said cage structure.

2. The combination of claim 1 wherein said oscillator includes a drive shaft, a pitman arm secured to said drive shaft and a drive link interconnecting the free end of said pitman arm and said cage sweep structure.

3. The combination of claim 1 wherein said cage sweep structure includes a plurality of axially spaced and parallel ribs curved about and spaced radially outward from the top exterior of said cage structure and wherein said tines are secured to the radially inner sides of said ribs.

4. The combination of claim 1 wherein said guide means includes a pair of arcuate rails on said combine and guide components on said cage sweep structure in cooperative guided relation to said rails.

5. The combination of claim 1 wherein said guide means includes arcuate rail means secured to one of said structures and roller means on the other of said structures in cooperative rolling engagement with said rail means.

6. The combination of claim 5 wherein said one structure is said cage structure.

7. The combination of claim 1 wherein said guide means includes an arcuate rail secured to one of said structures and presenting radially inner and outer guide surfaces and circumferentially spaced pairs of rollers rotatably mounted on the other of said structures, one of the rollers of each pair of rollers engaging said radially outer guide surface and the other of the rollers of each pair of rollers engaging said radially inner guide surface.

8. The combination of claim 7 wherein said one structure is said cage structure.

9. In an axial flow combine of the type having a processor for threshing and separating the seed from an agricultural crop which includes a foraminous cylindrical cage with radial openings and a rotatable rotor coaxially mounted within the cage on a substantially horizontal axis, a cage sweep mechanism comprising:
    a cage sweep including a plurality of generally parallel arcuate ribs extending circumferentially about and in radially spaced relation to the upper part of said cage in axially spaced relation to one another and a plurality of generally parallel and circumferentially spaced tines secured to the concave side of said ribs and extending axially along the outer periphery of said cage in radially spaced relation to the latter,
    at least two parallel and concentric arcuate rails secured to the outer periphery of said cage and each presenting radially inward facing and radially outward facing concentric guide surfaces,
    a first pair of circumferentially spaced guide roller assemblies on said cage sweep operatively associated with one of said arcuate guide rails,
    a second pair of circumferentially spaced guide roller assemblies on said cage sweep operatively associated with the other of said arcuate guide rails,
    each of said roller assemblies including rollers in rolling engagement with said guide surfaces on the associated rail, and
    an oscillator connected to said cage sweep and operable to cyclically move the latter back and forth on said guide rails, whereby said tines sweep accumulated crop material from the top of said cage.

10. The combination of claim 9 wherein each of said tines includes a part extending radially inward and downward.

11. The combination of claim 10 wherein said tines are V-shaped in section.

12. The combination of claim 9 wherein said oscillator includes a power transmitting shaft, a pitman arm secured to said shafts and a thrust transmitting link having one of its ends pivotally connected to the free end of said pitman arm and the other of its ends pivotally connected to said cage.

* * * * *